(12) United States Patent
Lamperth et al.

(10) Patent No.: US 8,624,456 B2
(45) Date of Patent: Jan. 7, 2014

(54) ROTOR FOR AN ELECTRICAL MACHINE (75) Inventors: Michael Ulrich Lamperth, Woking (GB); Malte Jaensch, London (GB)

(73) Assignee: EVO Electric Limited, London (GB)

( * ) Notice: Subject to any disclaimer, the term of this patent is extended or adjusted under 35 U.S.C. 154(b) by 192 days.

(21) Appl. No.: 12/811,979

(22) PCT Filed: Jan. 7, 2009

(86) PCT No.: PCT/GB2009/000032
§ 371 (c)(1),
(2), (4) Date: Sep. 28, 2010

(87) PCT Pub. No.: WO2009/087376
PCT Pub. Date: Jul. 16, 2009

(65) Prior Publication Data
US 2011/0006631 A1     Jan. 13, 2011

(30) Foreign Application Priority Data
Jan. 7, 2008  (GB) .................................. 0800225.5

(51) Int. Cl.
*H02K 1/27* (2006.01)
*H02K 21/24* (2006.01)
(52) U.S. Cl.
USPC ................. 310/156.31; 310/156.12; 310/268
(58) Field of Classification Search
USPC ................................ 310/43, 156.12–156.13, 310/156.28–156.31, 156.62–156.65, 268
See application file for complete search history.

(56) References Cited

U.S. PATENT DOCUMENTS

| | | | | | |
|---|---|---|---|---|---|
| 3,909,645 | A | * | 9/1975 | Herr et al. | 310/138 |
| 4,104,552 | A | * | 8/1978 | Tsergas | 310/156.12 |
| 4,587,450 | A | * | 5/1986 | Ozaki | 310/156.11 |
| 4,588,914 | A | * | 5/1986 | Heyne | 310/156.11 |
| 4,996,457 | A | * | 2/1991 | Hawsey et al. | 310/268 |
| 5,063,318 | A | * | 11/1991 | Anderson | 310/156.19 |
| 5,500,994 | A | * | 3/1996 | Itaya | 29/598 |
| 6,373,162 | B1 | * | 4/2002 | Liang et al. | 310/156.53 |
| 7,315,102 | B2 | * | 1/2008 | Minagawa | 310/156.32 |
| 2006/0238064 | A1 | * | 10/2006 | Lopatinsky et al. | 310/267 |

FOREIGN PATENT DOCUMENTS

| | | |
|---|---|---|
| DE | 2532049 | 2/1976 |
| EP | 2043231 | 4/2009 |
| GB | 2275371 | 8/1994 |
| JP | 62060451 | 3/1987 |

(Continued)

OTHER PUBLICATIONS

International Search Report and Written Opinion dated Dec. 9, 2009.

(Continued)

*Primary Examiner* — Tran Nguyen
(74) *Attorney, Agent, or Firm* — Pepper Hamilton LLP (57) ABSTRACT

A rotor (300) for an axial-flux electrical machine is disclosed. The rotor has a plurality of permanent magnets (350) fixed thereto, with each of the plurality of magnets extending at least partly through an aperture in the rotor. The arrangement is such that material of the rotor (200) abuts each magnet (350) so as to locate the magnet substantially circumferentially with respect to the axis of rotation of the rotor and substantially axially in at least one axial direction. The magnets (350) may slide radially onto the rotor (300) and be constrained axially and circumferentially by a tongue-and-groove arrangement (325, 355), with reinforced tape (340) being wound around the radially outer edge thereof to provide radial constraint.

3 Claims, 13 Drawing Sheets

(56) References Cited

FOREIGN PATENT DOCUMENTS

| JP | 62213540 | 9/1987 |
| JP | 3049545 | 3/1991 |
| JP | 2007-037210 | 2/2007 |
| JP | 2007-166828 | 6/2007 |
| WO | 2008134796 | 11/2008 |

OTHER PUBLICATIONS

Great Britain Search Report dated Apr. 30, 2009.

* cited by examiner

ROTOR FOR AN ELECTRICAL MACHINE

CROSS-REFERENCE TO RELATED APPLICATIONS

This application is the U.S. National Stage of International Application Serial No. PCT/GB2009/000032 filed Jan. 7, 2009, which claims priority to Great Britain Application No. 0800225.5 filed Jan. 7, 2008, the disclosure of which is incorporated herein by reference to its entirety.

TECHNICAL FIELD

This invention relates to a rotor for an axial-flux electrical machine. More particularly, but not exclusively, this invention relates to a rotor for an axial-flux electrical machine for use in a hybrid vehicle or a purely electric vehicle.

BACKGROUND

Hybrid vehicles are vehicles in which two power sources, for example an internal combustion engine and an electric motor, play a part in supplying power for use in automotive propulsion. In some hybrid vehicles, both the engine and the motor are connectable to driveline components for supplying rotary power to wheels for driving the vehicle. In other hybrid vehicles, only the motor is connectable to the driveline components for supplying the rotary power; and the engine is used only as a prime mover for driving a generator which generates the electrical power needed to operate the motor. Examples of existing hybrid vehicles include passenger cars (sometimes referred to as "automobiles"), vans, buses and light trucks. There is also an increasing interest in incorporating hybrid vehicle technology into light rail vehicles such as trams.

In nearly all hybrid vehicles, it is desirable to minimise the size and weight of the automotive components. In passenger cars, successfully minimising the size and weight of these components results in greater room and hence comfort for the passengers, and may also improve the operating efficiency of the vehicle. The same is true in other hybrid vehicles.

At the same time, it is also desirable to maximise the power output of electrical machines used in hybrid vehicles: consumers are used to the high power output of internal combustion engines and so would be disappointed with lesser performance from hybrid vehicles. This is true of both motors and generators used in hybrid vehicles. For motors, a high mechanical power output is needed in order to provide adequate automotive propulsion; and accordingly for generators, a high electrical power output is needed in order to operate the motors at high power.

Thus, for hybrid vehicles it is desirable to use electrical machines with high power output per unit mass (often referred to as "power density" and measured in kW/kg). Unfortunately, however, existing electrical machines do not satisfy these requirements and so do not lend themselves well to use in hybrid vehicles.

Similar considerations apply to electrical machines used to power purely electric vehicles.

Electrical machines that are of the axial-flux type are in several ways suited for use in hybrid vehicles and purely electric vehicles. One reason for this is because they can be designed to have a high power density. However, the design of axial-flux machines insofar as it relates to their assembly and operation is not optimised: assembly can be difficult and operation can be unreliable. This is particularly the case in relation to the rotors of such machines. An object of this invention is to address this problem.

SUMMARY

According to a first aspect of this invention, there is provided a rotor for an axial-flux electrical machine, the rotor having a plurality of permanent magnets fixed thereto, wherein each of the plurality of magnets extends at least partly through an aperture in the rotor, the arrangement being such that material of the rotor abuts the magnet so as to locate the magnet substantially circumferentially with respect to the axis of rotation of the rotor.

By providing apertures in the rotor that are arranged to receive magnets in this way, location of the magnets is provided, at least circumferentially, by surrounding material of the rotor abutting the magnets and retaining them in position. Thus, there is no need for additional, separate, structure to locate and retain the magnets at least circumferentially. As a result assembly is simplified and the magnets are held more reliably in position.

The aperture may be an aperture completely through the rotor from one side to the other. The aperture may be a blind aperture, such as a recess.

Material of the rotor may also abut each magnet so as to locate the magnet substantially axially in at least one axial direction. Material of the rotor may abut each magnet so as to locate the magnet substantially axially in both axial directions. Material of the rotor may also abut each magnet so as to locate the magnet substantially radially in one, at least one, or both, radial directions.

The rotor may be formed of more than one piece. The rotor may include a first rotor portion and a second rotor portion. The arrangement may be such that fitting the second rotor portion to the first rotor portion, with the magnets therebetween, locates the magnets therebetween substantially tangentially, substantially radially and substantially axially in at least one axial direction.

The first and second rotor portions may be arranged to encase the magnets therebetween axially. Each rotor portion may include apertures therethrough, each aperture sized to receive a respective magnet. Each rotor portion may be provided with abutment means adjacent the aperture to abut a magnet received therein so as to prevent it passing through the aperture. The abutment means may be adjacent one face of the respective rotor portion. The abutment means may serve to narrow the aperture. The abutment means may include at least one lip.

The first and second rotor portions may be arranged to encase the magnets therebetween radially. The first rotor portion may be arranged to abut the magnets in substantially both circumferential directions and one radial direction. The second rotor portion may be arranged to abut at least some of the magnets substantially in the other radial direction. The first rotor portion may have the apertures formed therein. The second rotor portion may be a substantially annular portion, or a segment of a substantially annular portion, that is arranged to surround all, or a segment of, the first portion with the magnets received therein. The second rotor portion may be formed of tape wound around the first rotor portion. The second rotor portion may be provided by a retaining ring. The retaining ring may be of the same material as the first rotor potion. The magnets and/or the first portion may be provided with structure that locates the magnets axially. The magnets and the first portion may be provided with cooperating structure that cooperates to locate the magnets radially. On the first portion, the structure may be provided in one or more side walls of the apertures. On the magnets, the structure may be provided in one or more side walls thereof. The cooperating structure may include a tongue-and-groove arrangement.

Two magnets may be received in each aperture. The two magnets may be axially juxtaposed. The rotor may be arranged to receive a first one of the two magnets in a first axial direction and a second one of the two magnets in a second axial direction. One or more sidewalls of each aperture may include an abutment against which one or both of the respective magnets abuts when received in the aperture. The abutment may be a lip. The two magnets in each aperture may be magnetised so as to attract one another, thereby providing axial location. The magnets may be magnetised such that one of each magnet in each aperture has a North-seeking pole facing axially inwards and the respective other magnet has a South-seeking pole facing axially inwards.

Each magnet may be fixed on the rotor by an adhesive material provided between each magnet and material of the rotor. The adhesive material may be a glue. Each magnet may be flush with surrounding material of the rotor on one or each side of the rotor.

The rotor may be of a magnetically and/or electrically insulating material. This assists in avoiding losses in the rotor, such as losses due to eddy currents, and assists in avoiding magnetic short circuits in the flux path. The rotor may be of a heat insulating material and may be resistant to high temperatures. The rotor may be of a composite material.

The rotor may be a substantially flat disc with apertures formed therein, each aperture sized to receive a respective magnet. Preferably each magnet fits in the respective aperture such that surrounding material of the rotor acts to locate the magnet radially, in one or both radial directions, and circumferentially.

By providing apertures in the rotor and a magnet that extends substantially through each aperture, the amount of magnetised material at angular locations of the rotor, for a given rotor thickness, is maximised. Thus, the strength of the excitation field set up by the permanent magnets is maximised for a given rotor thickness, thereby increasing the power density.

According to a second aspect of this invention, there is provided an axial-flux electrical machine having at least one rotor according to the first aspect.

According to a third aspect of this invention, there is provided a wheel for a vehicle and an electrical machine according to any previous aspect or embodiment this invention, wherein one of the rotor and the stator is coupled to the wheel and the other of the rotor and the stator is arranged for fixing to structure of the vehicle such that the electrical machine may be used as a direct drive motor in rotating the wheel and thereby driving the vehicle.

The electrical machine may also be arranged to operate as a generator to slow the vehicle by regenerative braking.

According to a fourth aspect of this invention there is provided a vehicle including the wheel and electrical machine of the fourth aspect.

The vehicle may include a respective electrical machine coupled to each wheel in this way.

BRIEF DESCRIPTION OF THE DRAWINGS

Specific embodiments of the invention will now be described by way of example only and with reference to the accompanying drawings, in which.

DETAILED DESCRIPTION OF CERTAIN EXEMPLARY EMBODIMENTS

Figure 1:
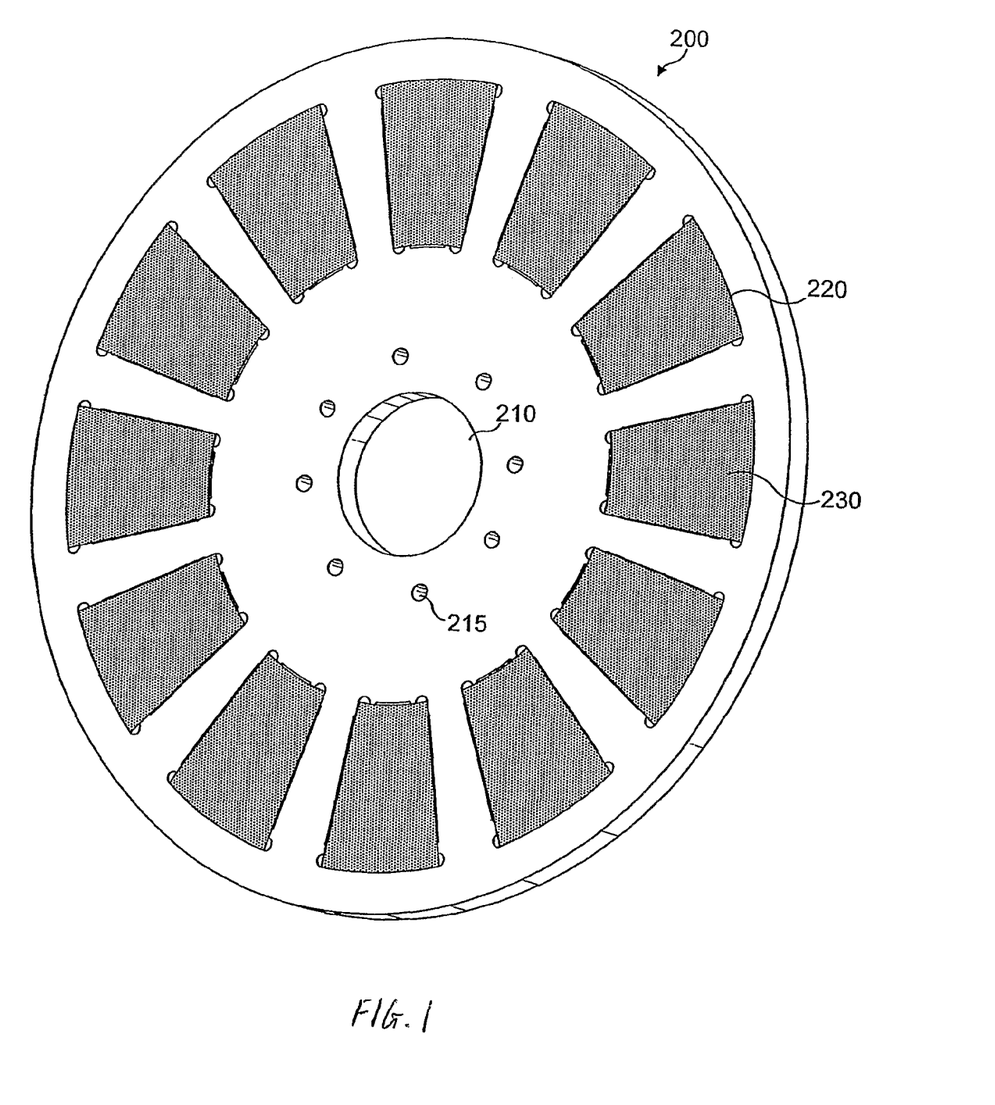
FIG. 1 is a perspective view of a first embodiment of a rotor arrangement for an electrical machine.

FIG. 1 shows a rotor 200 for use in an axial-flux electrical machine. The rotor 200 is a generally flat, thin, disc. It is formed from a composite material, which, in this embodiment, is a glass-fibre-and-resin-based cross-laminated material. The composite material is a good electrical insulator and a good thermal insulator. The rotor 200 has a central, round, aperture 210 through it. A series of smaller apertures 215 are formed through the rotor 200 in positions adjacent the central aperture 210 and so as to form, collectively, a ring around the central aperture 210 that is concentric with the central aperture 210 about the rotational axis of the rotor 200.

Figure 2:
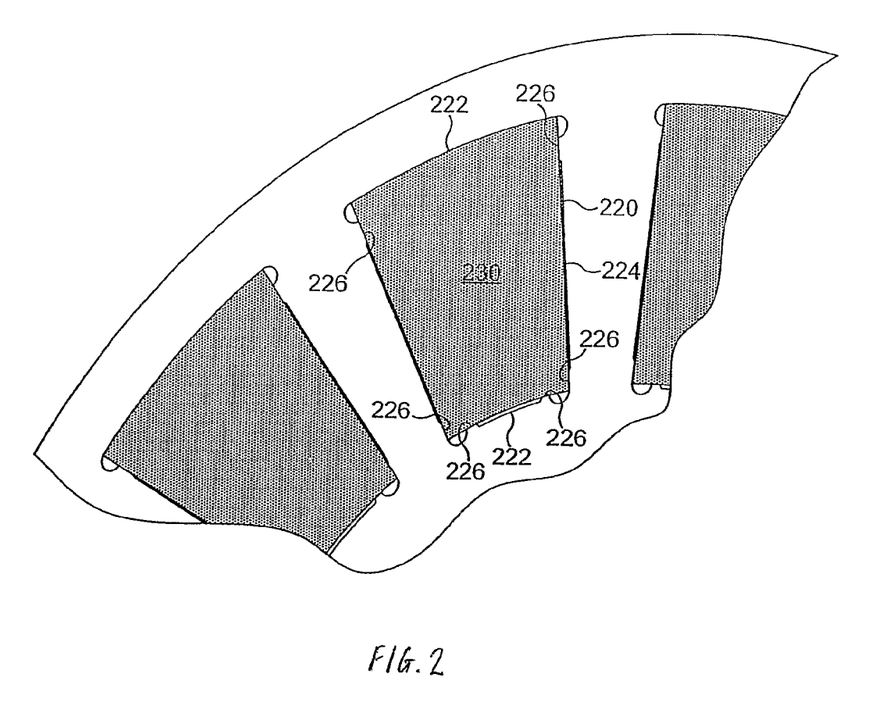
FIG. 2 is a detailed view of part of the arrangement of FIG. 1.

The rotor 200 of FIG. 1 includes twelve apertures 220 therethrough, each aperture being shaped like a segment of a flattened, planar, ring. Each of these apertures 220 is arranged adjacent the radially-outer edge of the rotor 200, and so as to be concentric therewith. The twelve apertures 220 are distributed around the rotor 200 with constant angular pitch. As is shown in FIG. 2, each of the twelve apertures 220 has two concentric arcuate sidewalls 222, concentric with the rotor 200, and two straight sidewalls 224 in-between the arcuate sides and extending radially. With continued reference to FIG. 2, sidewalls of the apertures 220 are slightly recessed along much of their length with respect to the ends of the sidewalls. This is true of the radially-innermost of the arcuate sidewalls 222 and the two radial sidewalls 224. Thus, there are projecting surfaces 226 towards the ends of each of the sidewalls 222, 224 that are slightly recessed. It is envisaged that the twelve apertures 220 be formed in the rotor 200 by milling.

As can be seen from FIG. 1, a permanent magnet 230 is provided in each of the twelve apertures 220. The magnets 230 are also shaped as segments of a flattened, planar, ring, with two arcuate and concentric sides and two straight and radially-extending sides therebetween. With reference to FIG. 2, it should be noted, however, that, in this embodiment, none of the sides of the magnets 230 are recessed. The magnets 230 are further sized and shaped such that each fits in one of the ring-segment apertures 220 such that sides of the magnets 230 are abutted by the projecting surfaces 226, and the radially-outermost arcuate side of each magnet 230 is abutted by structure of the rotor 200 defining the radially-outermost arcuate sidewall of the respective aperture 220. Thus, each magnet 230 is located radially and circumferentially with respect to the rotor 200. It will be appreciated that this arrangement gives rise to gaps between the sides of the magnets 230 and the recessed parts of sides of the apertures 220. An adhesive material, which in this embodiment is glue (not shown in the drawings), is provided in these gaps to provide adhesion between the magnets 230 and surrounding structure of the rotor 200. This retains the magnets 230 axially with respect to the rotor 200. The magnets are of a thickness such that surfaces of the magnets are flush with each side of the rotor 200 when positioned in the apertures 220 therethrough.

The magnets 230 are mounted on the rotor such that each has its polarities reversed with respect to its two immediate neighbours. Each magnet has two principle pole surfaces, these are the surfaces that are flush with the surfaces of the rotor 200.

Figure 3:
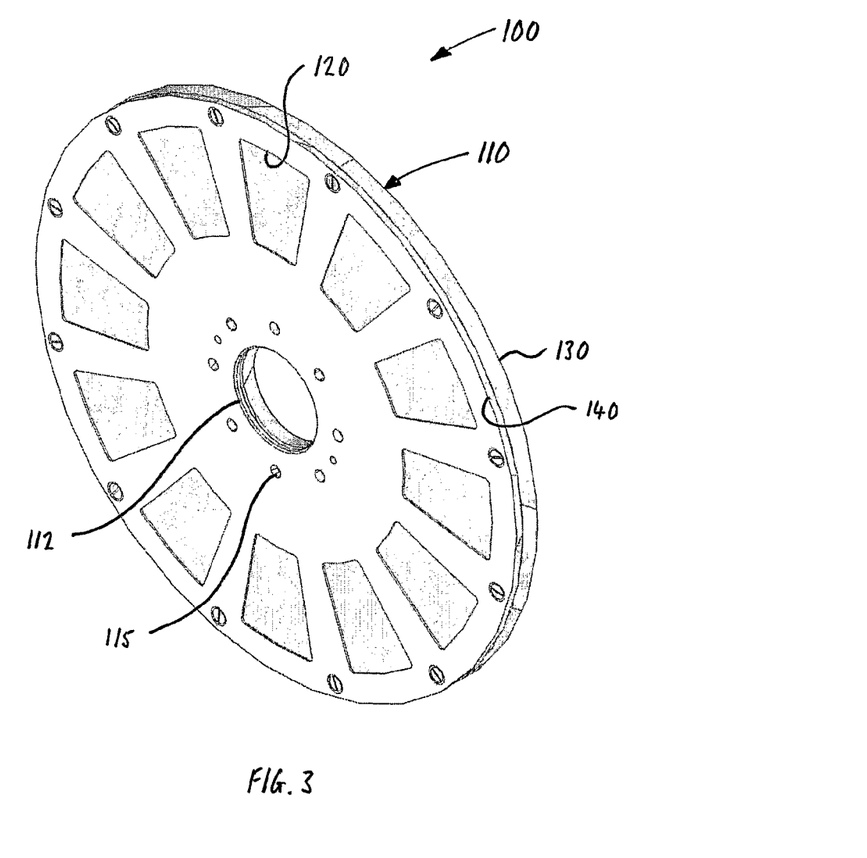
FIG. 3 is a perspective view of a second embodiment of a rotor arrangement for use in an electrical machine.

FIG. 3 shows a rotor arrangement 100 of a second embodiment that is made up of a rotor disc 110 and a series of magnets 120. The assembled arrangement 100 is similar in size and shape to that of the first embodiment described with reference to FIG. 1 and FIG. 2. Indeed, it is envisaged that the arrangement of the second embodiment is an alternative to that of the first embodiment and may be substituted therefor in an electrical machine.

The rotor disc 110 of this second embodiment is similar to that of the first embodiment in being formed of the same composite material and having a central aperture 112 together with a series of holes therearound 115. The rotor disc 110 is also similar in having twelve apertures 120 therethrough that are arranged adjacent the radially-outer edge of the rotor 110. The twelve apertures 120 in the rotor 110 of this embodiment are, again, similarly shaped to those of the first embodiment, but differ in certain important respects The rotor disc 110 of this embodiment differs, however, in that it is formed of two rotor portions 130, 140. Each of the two portions 130, 140 is a flat disc that fits together with the other axially: it is as if a single disc has been sliced in two to give two similar, but thinner, discs.

Figure 4:
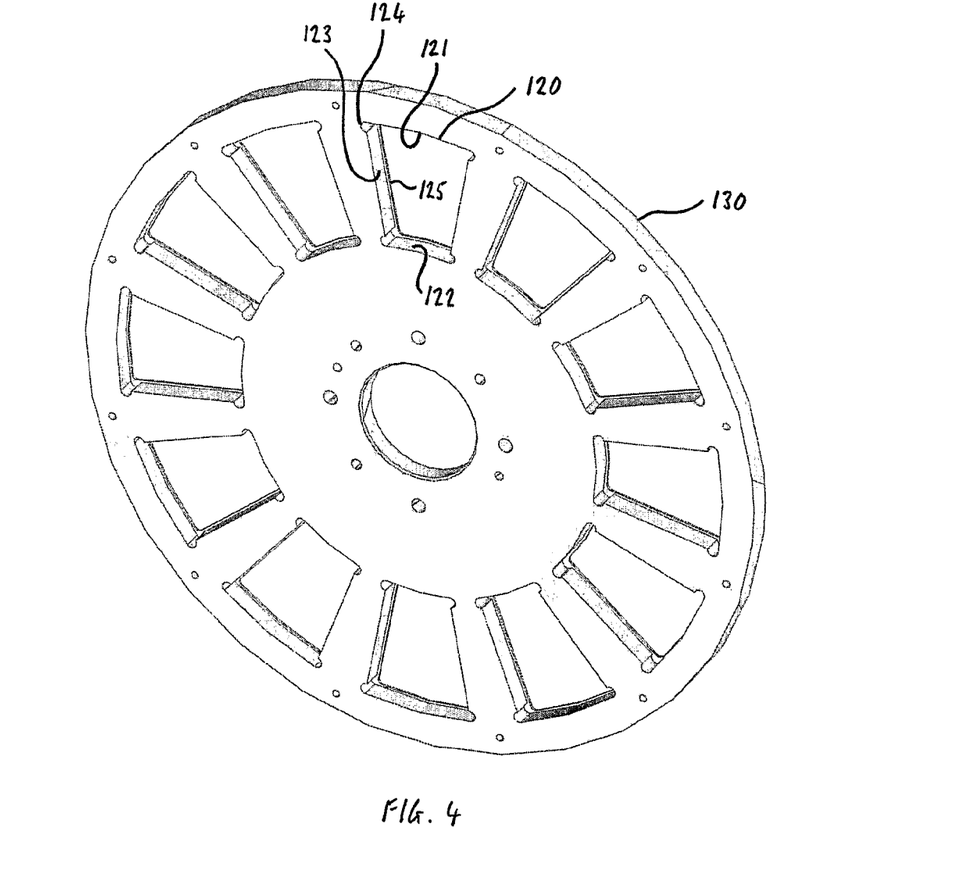
FIG. 4 is a perspective view of a first part of the rotor of the second embodiment.

FIG. 4 shows a first one of the rotor portions 130 in more detail. As can be seen, each of the twelve apertures 120 that is adjacent the radially outer edge of the rotor portion 130 is shaped generally like a segment from a flattened, planar, ring: that is, each segment has radially outer 121 and inner 122 sidewalls that are arcuate and concentric, with radial sidewalls 123 extending therebetween. An arcuate recess 124 is provided at each end of each of the radial sidewalls 123. As it is envisaged that the apertures are formed by milling, these recesses are to accommodate right-angled edges of the magnets (not shown in FIG. 4). Part of each of the sidewalls 121, 122, 123 projects slightly into the aperture 120 where the sidewalls 121, 122, 123 meet the axially-outer face of the rotor portion 130 (as opposed to the face that lies against the second rotor portion 140 when the two are placed together). The sidewalls 121, 122, 123 project so as to form a lip 125 that is flush with the outer face of the rotor portion 120 and that extends around the opening of the aperture 120 so as to narrow that aperture 120.

Figure 5:
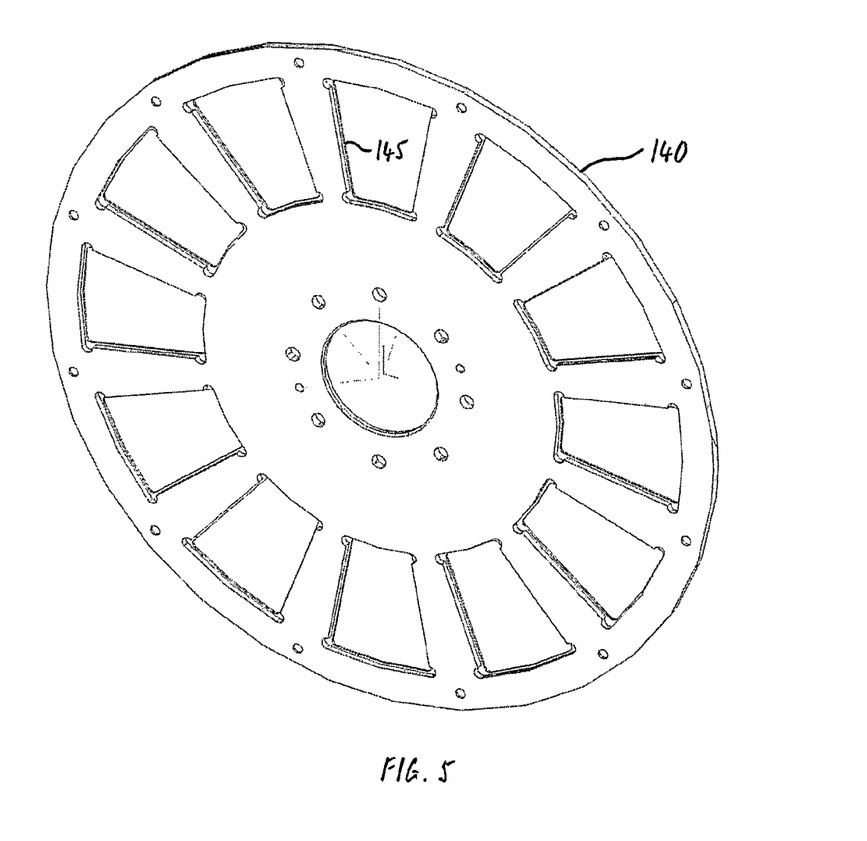
FIG. 5 is a perspective view of a second part of the rotor of the second embodiment.

FIG. 5 shows the second rotor portion 140 in more detail. The second rotor portion 140 is the similar to the first 130, but is thinner in an axial direction. It will therefore be appreciated that the second rotor portion also has a lip 145 that extends around the opening of the each aperture 120 and that is flush with the axially-outer face of the second rotor portion 140.

Figure 6:
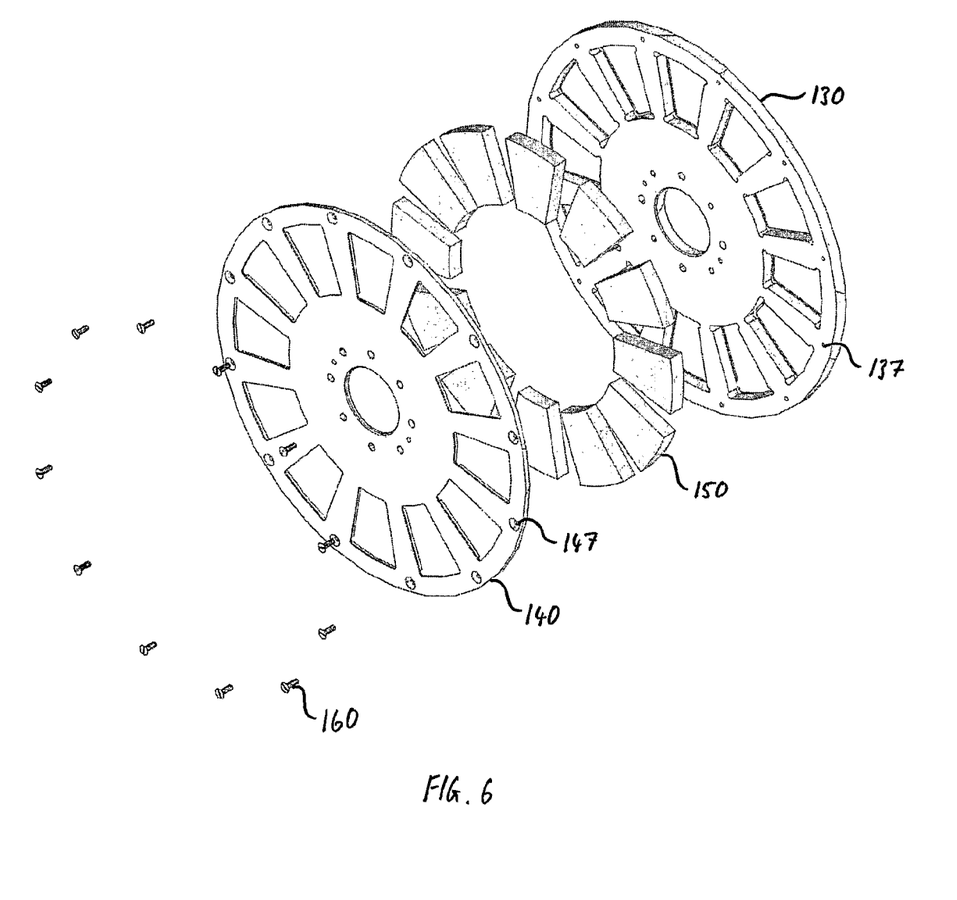
FIG. 6 is an exploded perspective view of the rotor arrangement of FIG. 3.

FIG. 6 shows the two rotor portions 130, 140 axially spaced apart from each other. As can be seen from FIG. 6, the rotor arrangement 100 also includes twelve magnets 150 that are shaped as the magnets of the first embodiment. The magnets 150 of this embodiment are sized and shaped to fit within the apertures 120 formed in the first 130 and second 140 rotor portions. The magnets 150 fit within the portions such that they are abutted (with respect to the axis of rotation of the rotor) circumferentially and radially by the sidewalls 121, 122, 123 of the two rotor portions 130, 140 to locate the magnets 150 circumferentially and radially; and axially by the lips 135, 145 of the rotor portions 130, 140 when these two rotor portions 130, 140 are brought together to locate the magnets 150 axially. The second rotor portion 140 includes a plurality of bolt holes 147 adjacent the radially outer edge thereof. The first rotor portion 130 includes a plurality of corresponding holes 137 that are threaded to receive a respective bolt 160. The two rotor portions 130, 140 are fixed together by fitting a respective bolt 160 through each bolt hole 147 into a respective one of the threaded holes 137. The reason for the first rotor portion 130 being thicker than the second rotor portion 140 in the present embodiment is to allow the threaded holes 137 to be of sufficient length to retain the bolts 160. In other embodiments the relative thicknesses of the first 130 and second 140 rotor portions may differ.

Figure 7:
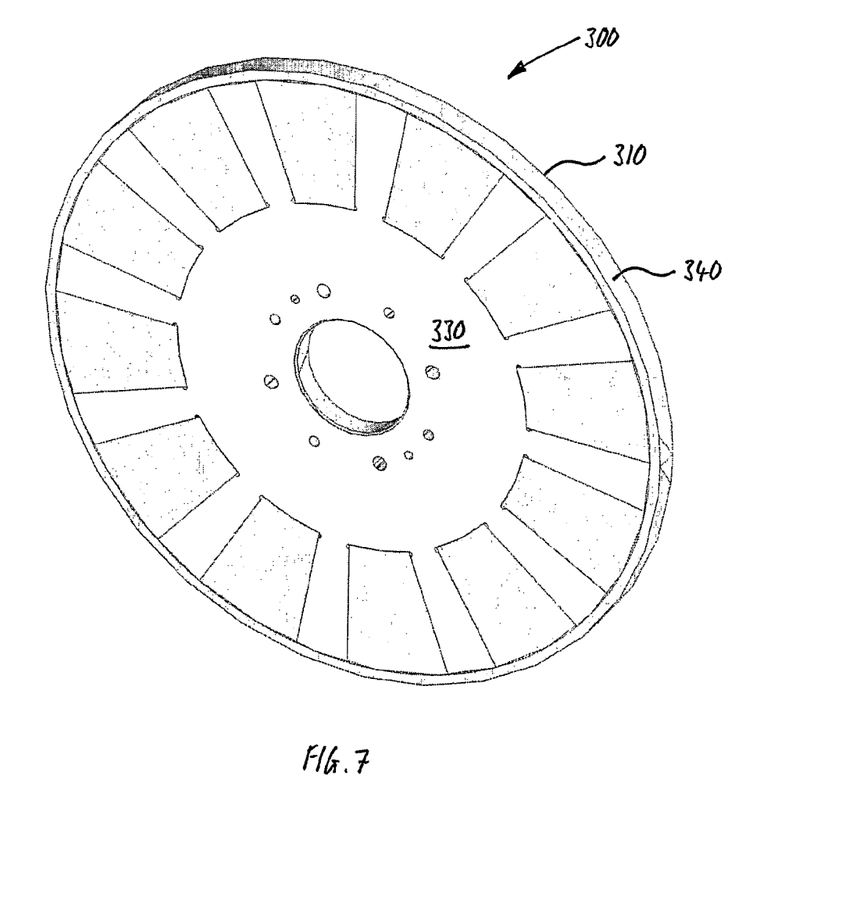
FIG. 7 is a perspective view of a third embodiment of a rotor arrangement for use in an electrical machine.

FIG. 7 shows a rotor arrangement 300 of a third embodiment. In similarity with the second embodiment, the rotor 310 of this embodiment is formed of a first rotor portion 330 and a second rotor portion 340. However, in this embodiment, the two rotor portions 330, 340 fit together in a radial direction, rather than an axial direction.

Figure 8:
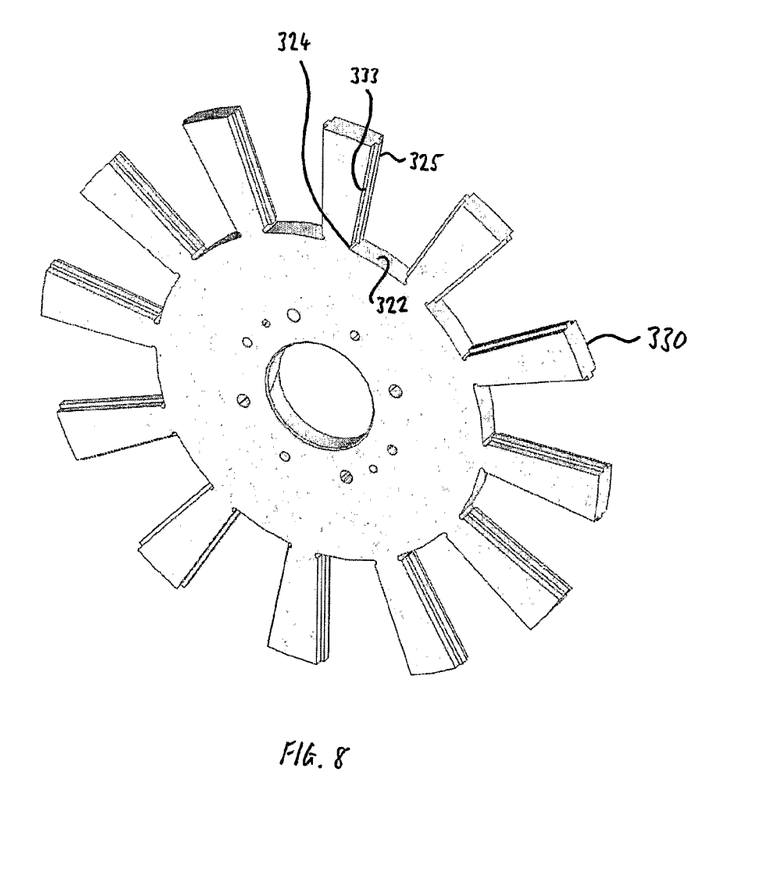
FIG. 8 is a perspective view of a rotor of the third embodiment.

FIG. 8 shows the first rotor portion 330 in more detail. The first rotor portion is similar to that of the first embodiment, but differs in two respects. Firstly, the first rotor portion 330 lacks the radially-outer part thereof that provides the radially-outer arcuate sidewall of each of the magnet-receiving apertures through the rotor of the first embodiment. Thus, the first rotor part 330 of this embodiment provides only a radially-inner arcuate sidewall 322 and two radial sidewalls 323 extending radially outwards therefrom, each with an arcuate recess 324 at the radially inner end only thereof. The first rotor portion 330 therefore resembles a "spider", in the engineering sense of that word. A projecting ridge 325 projects from the middle of each of the radially-extending sidewalls 323 and extends along the length of each of those sidewalls.

Figure 9:
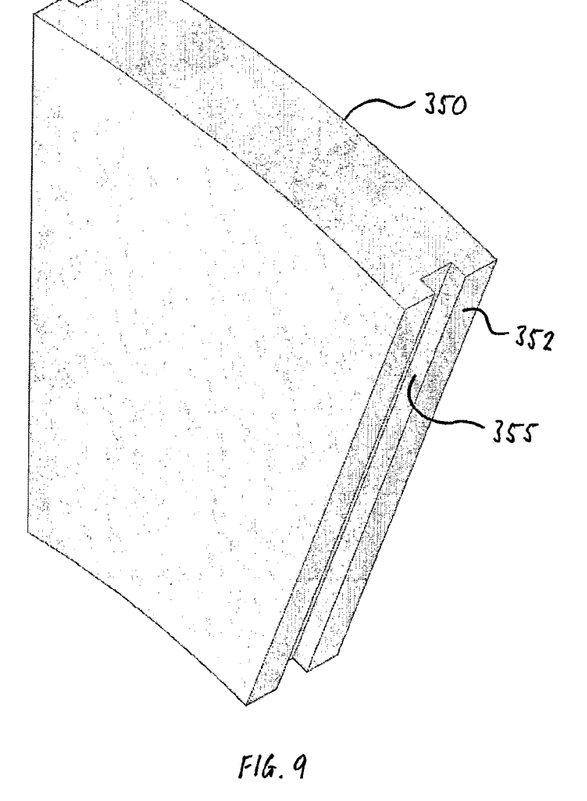
FIG. 9 is a perspective view of a magnet of the third embodiment.

FIG. 9 shows a representative one of twelve magnets 350 of the rotor assembly 300 of this third embodiment. The magnet 350 is as those of the first and second embodiments but differs in having a groove 355 formed in each of the radially-extending sidewalls 352 thereof. Each groove 355 is formed in the middle of each of the radially-extending sidewalls 352 and runs the length thereof.

With reference again to FIG. 7, the magnets 350 are slotted into the apertures through the first rotor portion 330, with each projecting ridge 325 of the first rotor portion 330 fitting into a respective groove. Adhesive tape reinforced with wire is then wound repeatedly around the radially outer edge of the first rotor portion 330 to form the second rotor portion 340. Thus, the first rotor portion 330 and the second rotor portion cooperate to locate the magnets 350 radially. Circumferential and axial location is provided by the first rotor portion 330, with the projecting ridges 325 of the first rotor portion 330 and cooperating grooves 355 in the magnets providing the axial location by virtue of a tongue-and-groove type arrangement. Whilst in this embodiment adhesive tape is used to form the second rotor portion 340, it is envisaged that this portion 340 may be formed in other ways. For example, the second rotor portion 340 could be a ring of composite material formed by laying-up appropriate material on a forming mandrel. The ring would then be fitted to the outside of the first rotor portion 330 and glued in place. It is envisaged that the ring could be shrink-fitted to the outside of the first rotor portion 330 by heating the ring such that it can be fitted and then allowing it to cool into a tight fit around the first rotor portion 330. When heated, the ring may or may not be an interference fit. Alternatively, the ring could be press-fitted to the outside of the first rotor portion 330 without first heating the ring.

Figure 10:
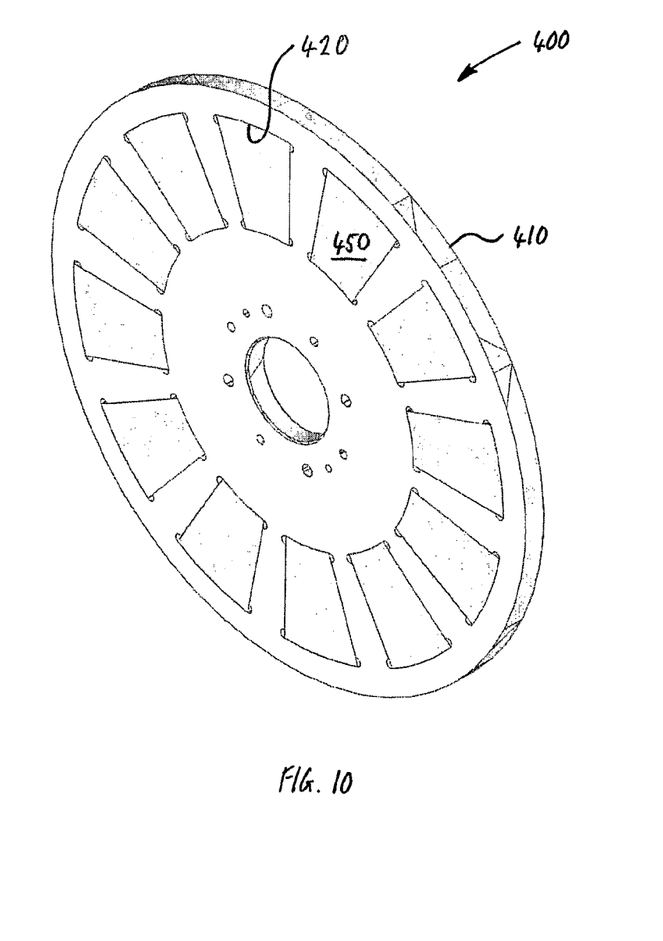
FIG. 10 is a perspective view of a rotor arrangement of a fourth embodiment.

FIG. 10 shows a rotor arrangement 400 of a fourth embodiment. In this embodiment, the rotor 410 is formed as a single portion, but there are two magnets 450 in each magnet-receiving aperture therethrough 420. The general arrangement is shown in FIG. 11, with more detail being shown in FIG. 12 and FIG. 13.

Figure 12:
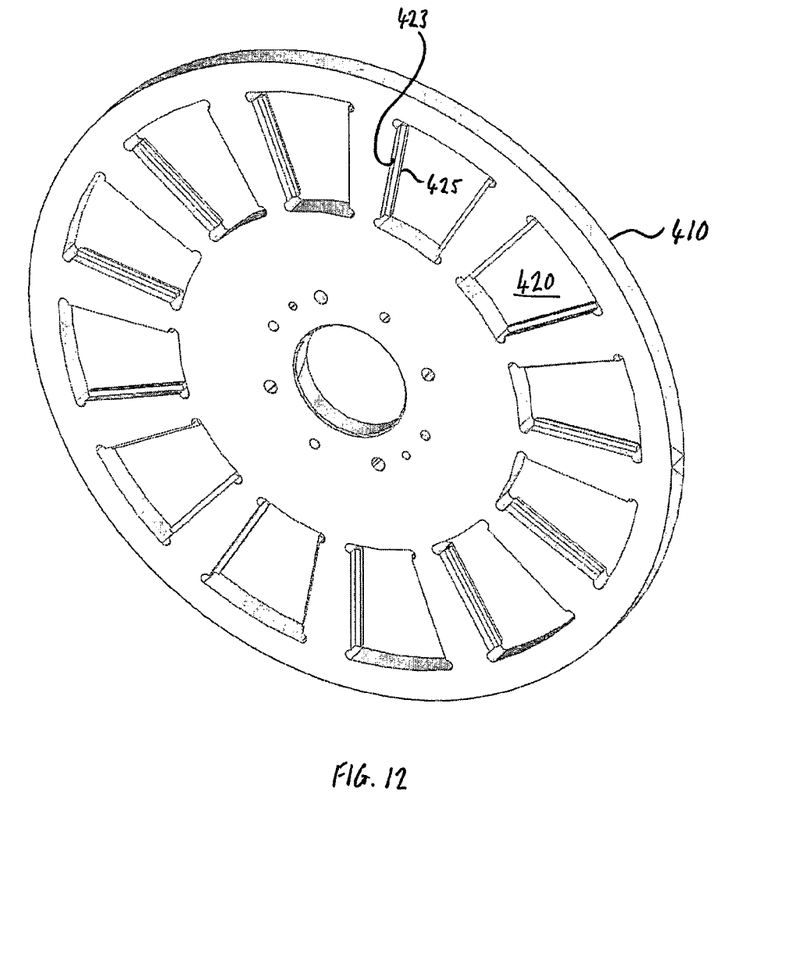
FIG. 12 is a perspective view of a rotor of the fourth embodiment.

With reference to FIG. 12, the rotor 410 of this embodiment is generally the same that the first rotor portion 130 of the second embodiment, but differs in lacking the lip 150 of that first rotor portion 130 and instead including projecting ridges 425 along the radially-extending sidewalls 423 of the apertures 420 through the rotor 410. The ridges 425 extend along the middle of the radially-extending sidewalls 423, between ends thereof, and thus are similar to those 325 of the third embodiment.

Figure 13:
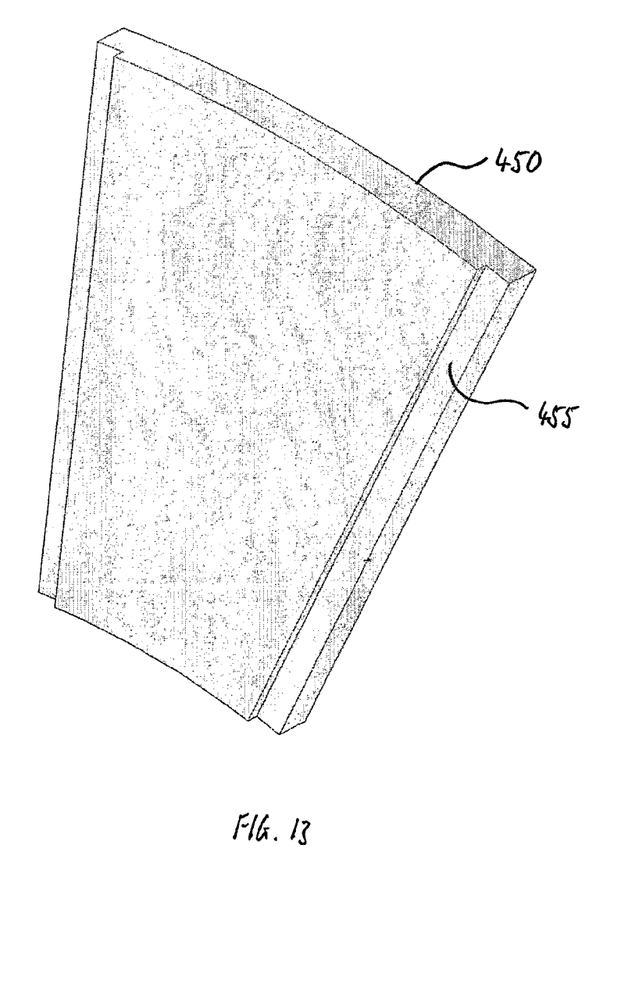
FIG. 13 is a perspective view of a magnet of the fourth embodiment.

With reference to FIG. 13, each magnet 450 of the rotor arrangement 400 of this embodiment is geometrically the same as the other. Thus, for simplicity, a representative single magnet 450 only is described. Each magnet 450 is shaped generally as the magnets of the first and second embodiments, but differs in being slightly less that half the thickness (in an axial direction) and having a recess 455 formed along each radially-extending edge of one face only. Whilst, as mentioned, the magnets 450 are geometrically the same, each of the two magnets 450 that is received in the same aperture 420 is magnetised differently. One of the magnets 450 is magnetised such that the face along which the recesses 455 extend is a North-seeking pole. The other of the magnets 450 is magnetised such that the face along with the recesses 455 extend is a South-seeking pole.

Figure 11:
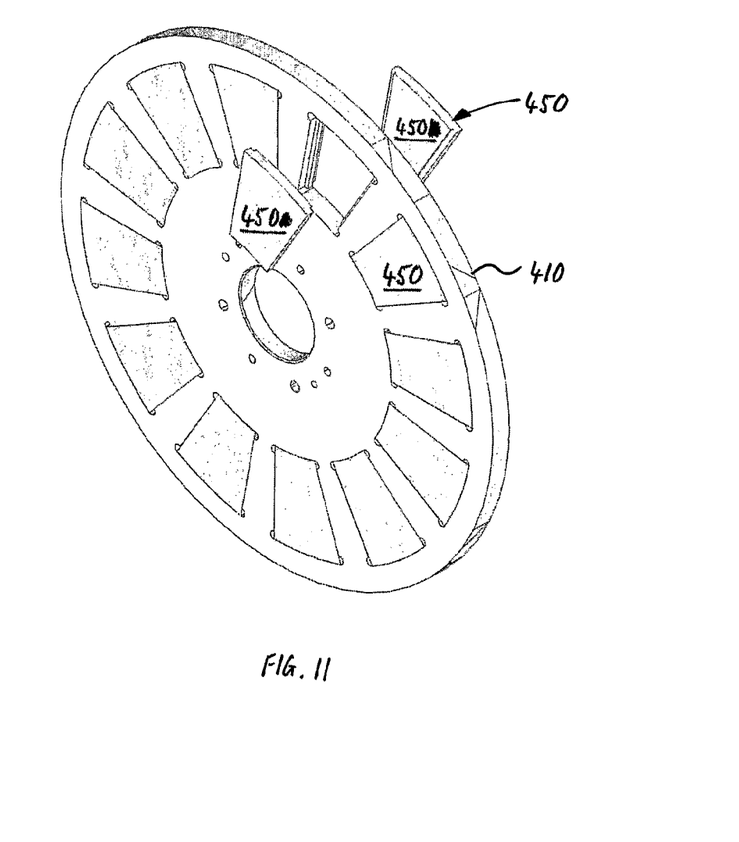
FIG. 11 is a partially-exploded perspective view of the rotor arrangement of FIG. 10.

With reference to FIG. 11, two differently-magnetised magnets 450 are fitted into each aperture 420 in the rotor 410. A first one of the two magnets 450 is introduced into the aperture 420 from one side of the rotor 410 such that the projecting ridge 425 fits into the recess to locate the portion 450. The other magnet 450 is fitted in the same way from the other side of the rotor 410. As the two magnets 450 are differently magnetised, magnetic attraction between the magnets 450 holds the magnets in place. The arrangement is such that there is a small axial gap between the two magnets 450 in each aperture. Thus, the magnetic attraction causes each of the two magnets 450 to abut the projecting ridge 425. It is envisaged that the small axial gap would be of the order of 10 microns. It is generally preferred that any gap between the two magnets 450 be minimised in order to encourage the passage of magnetic flux between the two magnets 450.

Thus in this embodiment, the rotor 410 provides radial and circumferential location of the magnets 450 and also locates each of the magnets 450 in one of the two possible axial directions.

In other embodiments, it is envisaged that there may be no gap between the two magnets 450 in the same aperture 420. Ideally, the dimensions of the magnets 450 and the rotor 410 would be such that the magnets 450 also abut the projecting ridge 425, but this depends on the relevant manufacturing tolerances.

In further embodiments, it is envisaged that an adhesive, such as glue, may be provided between the two magnets 450 in the same aperture 420 such that the adhesive at least partly serves to hold the two magnets 450 together. An adhesive that has vibration-absorption properties, such as glue that cures to become resiliently deformable, may be used in order to absorb vibrations.

It is envisaged that the rotor arrangements described above are for use in an electrical machine that is suited to high power applications. For example, the electrical machine may be suited to use as a generator in a diesel-electric generator set in a large hybrid-vehicle such as a tram or a bus. The electrical machine may also be suited to use as a motor in such a vehicle for providing automotive mechanical power.

In still further embodiments, the rotor disc arrangements described above are modified so as to be capable of use in an electrical machine that can be operated as an eddy current motor. In such further embodiments, the rotor discs described above would be replaced by a disc formed at least partly of an electrically conductive material. Applying a varying current to the stator winding would cause the machine to operate as an eddy current motor. Applying a constant would acts to brake the machine. The conductive material may be arranged to channel the current induced therein. This may be done by the provision of slots in the conductive material of the replacement rotor. The slots may be radial. In other words, the rotor could form an equivalent of the squirrel cage sometimes used in radial electrical machines.

In yet further embodiments, the magnets 450 may be "split" (that is may be made up of a plurality of magnet portions that interface one another) other than in the plane of the rotor in order to reduce eddy currents induced therein. For example, the magnets may be split in a substantially axial-radial plane or may be split in a substantially axial-tangential plane. Each magnet may be split in this way so as to be made up of two, three or more magnet portions. The portions may be joined to each other by an adhesive, such as glue, that is preferably electrically insulating. Alternatively, the portions may be located relative to each other in the rotor by abutments formed in material of the rotor that serve to space the portions from each other.

What is claimed is:

1. A rotor for an axial-flux electrical machine, the rotor comprising:
    a rotor body having an axis of rotation, and defining a plurality of axially extended apertures therethrough, the rotor body having first and second rotor portions; and
    a plurality of permanent magnets fixed to the rotor body, each of the plurality of permanent magnets extending at least partly through respective apertures in the rotor body and engaging with the rotor body;
    wherein the first rotor portion is of a composite material and comprises:
    a central portion;
    a plurality of retaining portions that are attached to, and extend radially outwardly from, the central portion, the plurality of retaining portions being circumferentially spaced around the central portion, so as to define the plurality of apertures therebetween, each of the plurality of apertures extending through the first rotor portion in an axial direction, and being bounded by substantially opposing edge regions of adjacent retaining portions in a circumferential direction, each of the plurality of apertures being closed by the central portion in a radially inward direction so as substantially to prevent movement of the magnets in the radially inward direction, and being open in a radially outward direction, each such edge region defining a projecting ridge which extends the length of that edge region; and wherein each of the plurality of permanent magnets has a groove in radially-extending sidewalls thereof, each groove being formed substantially centrally of such radially-extending sidewalls and extending the length thereof, each of the plurality of permanent magnets being located in respective of the plurality of apertures of the first rotor portion, with each projecting ridge of the first rotor portion fitting into a respective groove of a sidewall of a magnet, so as to provide a tongue and groove arrangement, such that each of the plurality of permanent magnets is retained in the rotor body in both axial directions and in both circumferential directions by respective pairs of retaining portions; and wherein the second rotor portion comprises an annular component configured to engage with radially outer edge regions of each of the plurality of retaining portions, and extend between the radially outer edge regions of adjacent retaining portions so as to close the plurality of apertures in a radially outward direction, thereby retaining the plurality of permanent magnets in an outwardly radial direction, the second rotor portion being arranged to surround all of the first rotor portion and being formed of tape wound around the first rotor portion.

2. A rotor according to claim 1, wherein the composite material of the first rotor portion is one of a magnetically insulating material and an electrically insulating material.

3. An axial-flux electrical machine comprising at least one rotor comprising:
   a rotor body having an axis of rotation, and defining a plurality of axially extended apertures therethrough; and
   a plurality of permanent magnets fixed to the rotor body, the plurality of permanent magnets extending at least partly through respective apertures in the rotor body, and engaging with the rotor body;
   wherein the first rotor portion is of a composite material and comprises:
      a central portion;
      a plurality of retaining portions that are attached to, and extend radially outwardly from, the central portion, the plurality of retaining portions being circumferentially spaced around the central portion, so as to define the plurality of apertures therebetween, each of the plurality of apertures extending through the first rotor portion in an axial direction, and being bounded by substantially opposing edge regions of adjacent retaining portions in a circumferential direction, each of the plurality of apertures being closed by the central portion in a radially inward direction so as substantially to prevent movement of the magnets in the radially inward direction, and being open in a radially outward direction, each such edge region defining a projecting ridge which extends the length of that edge region; and
   wherein each of the plurality of permanent magnets has a groove in radially-extending sidewalls thereof, each groove being formed substantially centrally of such radially-extending sidewalls and extending the length thereof, each of the plurality of permanent magnets being located in respective of the plurality of apertures of the first rotor portion, with each projecting ridge of the first rotor portion fitting into a respective groove of a sidewall of a magnet, so as to provide a tongue and groove arrangement, such that each of the plurality of permanent magnets is retained in the rotor body in both axial directions and in both circumferential directions by respective pairs of retaining portions; and
   wherein the second rotor portion comprises an annular component configured to engage with radially outer edge regions of each of the plurality of retaining portions, and extend between the radially outer edge regions of adjacent retaining portions so as to close the plurality of apertures in a radially outward direction, thereby retaining the plurality of permanent magnets in an outwardly radial direction, the second rotor portion being arranged to surround all of the first rotor portion and being formed of tape wound around the first rotor portion.

* * * * *